Sept. 25, 1951     R. BERNSTEIN     2,568,707
DETERGENT TESTING MACHINE

Filed Sept. 13, 1946     2 Sheets—Sheet 1

INVENTOR.
RUBIN BERNSTEIN
BY M. O. Hayes
ATTORNEY

Sept. 25, 1951  R. BERNSTEIN  2,568,707
DETERGENT TESTING MACHINE
Filed Sept. 13, 1946  2 Sheets-Sheet 2

INVENTOR.
RUBIN BERNSTEIN
BY
ATTORNEY

Patented Sept. 25, 1951

2,568,707

UNITED STATES PATENT OFFICE 2,568,707

DETERGENT TESTING MACHINE

Rubin Bernstein, Philadelphia, Pa.

Application September 13, 1946, Serial No. 696,964

4 Claims. (Cl. 73—432)

(Granted under the act of March 3, 1883, as amended April 30, 1928; 370 O. G. 757)

This invention relates to machines for testing the efficacy of detergents, and more specifically to machines that permit an evaluation of the efficacy of detergents in terms of the ability of said detergents to remove soil from specimens of fabric by the action of said detergents on said specimens under standardized conditions.

In general it is an object of the invention to provide a machine that is simple in construction, readily assembled, easily operated and efficient in performance.

Another object is to obtain a degree of accuracy and reproducibility of results of tests that surpasses the capabilities of previous testing machines.

Another object is to provide frames for mounting fabric test pieces involved in tests, thereby securing the uniform and repetitive exposure of the said fabric test pieces to the action of the detergent, and thereby also facilitating (by virtue of the uniformity of cleaning action upon the entire surface of the said fabric test pieces) the determination of the degree of cleaning achieved in a test.

Another object is to afford facilities for comparison of the cleaning action of a given detergent solution on a plurality of fabric test pieces of the same or different kinds under controllable conditions, thereby enabling the operator to judge of the relative utility of the various fabric materials, or of alternative methods for soiling materials artificially, as factors in the testing of detergents.

Figure 1:
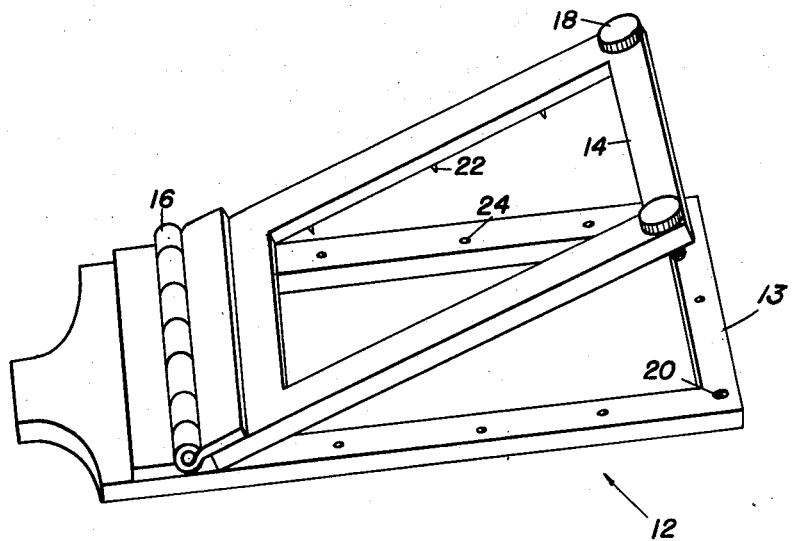
Figure 2:
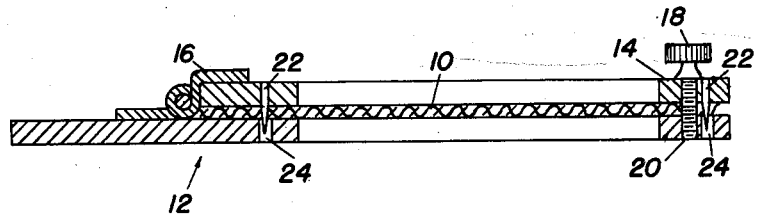
Figure 3:
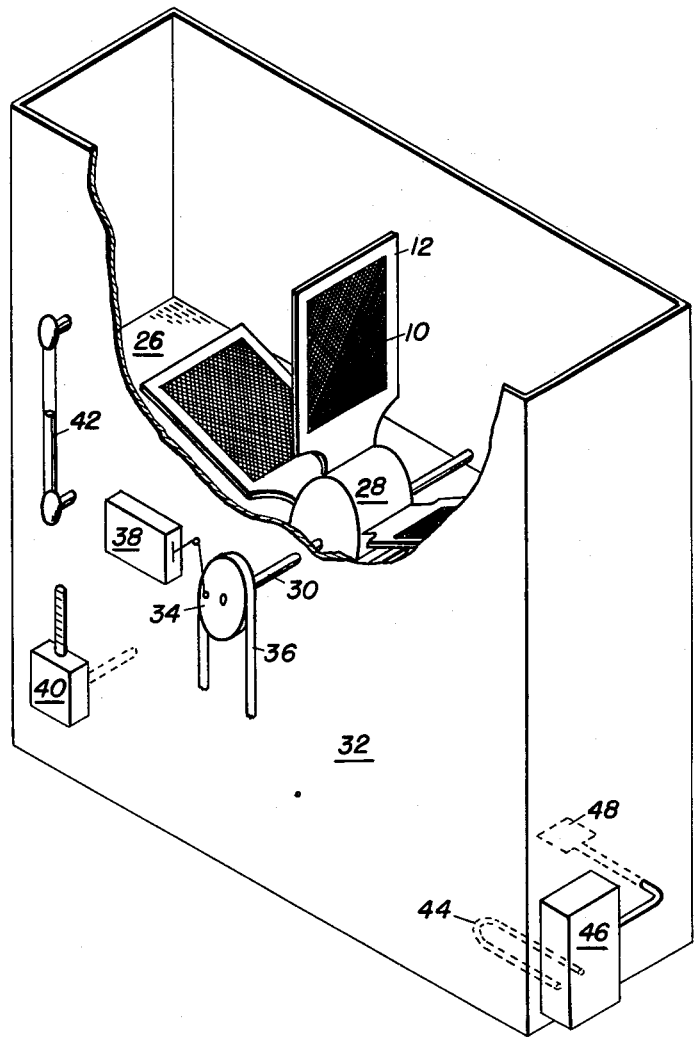

Further objects and advantages of this invention, as well as its construction, arrangement and operation, will be apparent from the following description and claims in connection with the accompanying drawings, in which Fig. 1 shows one form of frame adapted for mounting a test piece of fabric, the said frame being shown in its open position and in perspective view;

Fig. 2 is a longitudinal section of the frame depicted in Fig. 1, taken in closed position and illustrating the manner of mounting securely a test piece of fabric by closing the halves of the frame upon it; and Fig. 3 is a perspective view of one form of machine comprising a number of said frames and related parts suitable for conducting a test.

Hitherto it has been customary in the conduct of laboratory tests on detergents to use a machine described as a "Launderometer," comprising a heavily constructed copper tank mounted upon a rigid angle-iron frame, and a metal rotor carrying 20 standard pint jars within the said tank. The "Launderometer" is used by inserting in each jar a specimen of soiled fabric, a quantity of detergent solution, and rubber or metal balls that are said to increase the intensity of the action and to approximate the conditions obtaining in laundry and scouring practice; thereupon mounting the said jars securely on the aforementioned rotor and causing the entire rotatable assembly to revolve at a standard speed for a predetermined time within the copper tank, the said copper tank meanwhile containing a quantity of fluid whose purpose is to provide an environment of predetermined temperature for the said standard jars and their contents.

Measurements are made by means of a photometer, reflectometer, or other appropriate device to determine the brightness of the specimen of fabric both before and after the exposure of the fabric to the action of the detergent in the testing machine. The effectiveness of the detergent is gauged by comparing the two brightness measurements thus obtained.

It has been found that considerable variation occurs in the results of tests conducted with the "Launderometer" even though all reasonable precautions are taken to duplicate the conditions of test. The variation in results is attributed to the fact that the soiled fabric is not washed evenly and its brightness is therefore difficult to measure with accuracy at the completion of the test. This is thought to be a consequence of the fact that the fabric is disposed haphazardly within the jar during the test, and the said fabric tends to roll up into a compact mass whose inner part is less subject to cleaning action than is its outer part. Another objection to the use of the "Launderometer" is that the fabric specimens fray and shrink during the cleaning action.

Because of the non-reproducibility of test results when the "Launderometer" is used, the American Society for Testing Materials has reported in its "Proceedings," vol. 43, pp. 378–384 ". . . this method should not be considered sufficiently accurate for referee work on synthetic detergents," and the American Oil Chemists' Society has reported in "Oil and Soap," vol. 10, p. 232, that there is "no possibility of regarding the soiled cloth launderometer method as a general method for evaluating detergents."

The present invention overcomes the objections mentioned and affords test results of a high degree of uniformity. The manner in which this is accomplished will be evident from the drawings and the following description:

A specimen of artificially soiled fabric 10 is mounted in a frame 12, that is preferably composed of two laminae 13 and 14 joined by a hinge 16 and secured together by bolts or screws 18 passing through one of the said two laminae and engaging with threaded holes 20 in the other of the said two laminae. The fabric can be secured to the frame by any convenient means, such as by means of pins 22 mounted in one of the said two parts of the said frame, said pins being so disposed as to penetrate the said fabric 10 at several points around its perimeter. To permit the passage of the said pins completely through the fabric, holes or recesses 24 are provided to accommodate the points of the said pins. A mechanism is provided wherein one or more of the aforementioned fabric test pieces 10 carried in frames 12 can be subjected to the action of a detergent solution 26, and one form of such a mechanism is illustrated in Fig 3. The frames 12 in the example given are mounted either permanently or detachably on a hub 28 supported by a shaft 30 mounted rotatably in the housing or container 32, which said container also carries a quantity of the detergent solution 26. Means are provided to assure the rotation of the shaft 30 at a controllable rate of speed, in either direction or in both directions alternately, such as by use of the pulley 34 and belt 36 receiving mechanical energy from an electric motor or other source of motive power, which forms no part of this invention and is not shown. Apparatus is provided that contributes to the definite determination of conditions influencing the test, such as a shaft revolution counter 38 for establishing the speed and duration of cleaning tests in terms of the number of passages of frames 12 through the detergent solution 26, a thermometer 40 for noting solution temperature, a gauge glass 42 for verifying the quantity of solution in use, a heating element 44 for maintaining a desired solution temperature, and a controlling device 46 for said heating element that can be accompanied by a temperature-sensitive element 48 to enable the control to function automatically.

Automatic controls are provided for varying factors such as angular velocity, temperature, total period of operation, etc.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A testing machine comprising a container adapted to contain a detergent in association with a liquid, rotatable means in said container, and spaced frames each having a tongue portion attached to said rotatable means and extending outwardly therefrom, each frame being adapted to hold a piece of fabric with a specific area thereof exposed constantly.

2. A testing machine comprising a container adapted to contain a detergent in association with a liquid, rotatable means in said container, and spaced frames attached to said rotatable means and projecting radially therefrom, said frames each comprising a pair of jaws adapted to clamp onto a fabric piece and each adapted to hold a piece of fabric with a specific area thereof exposed constantly.

3. A testing machine comprising a container adapted to carry a detergent, a hub mounted rotatably in said container, means to rotate said hub, and a plurality of frames attached removably to said hub and projecting radially therefrom, said frames each comprising a first lamina having a plurality of spaced holes in a face thereof and a tongue adapted to be received by said hub, a second lamina hinged to said first lamina, said second lamina having a plurality of spaced pins adapted to register with corresponding holes, and means to secure said laminae in registry whereby a piece of fabric can be held therebetween with a specific area of such fabric exposed constantly.

4. A testing machine comprising a container adapted to contain a detergent in association with a liquid, rotatable means in said container, and spaced frames each having a tongue portion attached to said rotatable means and extending radially therefrom, each frame being adapted to hold a piece of fabric with a specific area thereof exposed constantly.

RUBIN BERNSTEIN.

REFERENCES CITED

The following references are of record in the file of this patent:

UNITED STATES PATENTS

| Number | Name | Date |
| --- | --- | --- |
| 178,921 | Gibbs | June 20, 1876 |
| 767,969 | Steen | Aug. 16, 1904 |
| 861,649 | Hannah | July 30, 1907 |
| 1,945,444 | Rutherford | Jan. 30, 1934 |
| 2,198,971 | Neufeld | Apr. 30, 1940 |